United States Patent
Mori

(10) Patent No.: US 7,155,125 B2
(45) Date of Patent: Dec. 26, 2006

(54) CONTROL APPARATUS AND CONTROL METHOD FOR OPTICAL SWITCH USING MEMS MIRRORS

(75) Inventor: Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 10/752,187

(22) Filed: Jan. 7, 2004

(65) Prior Publication Data

US 2004/0141682 A1 Jul. 22, 2004

(30) Foreign Application Priority Data

Jan. 9, 2003 (JP) .............................. 2003-003477

(51) Int. Cl.
*H04J 14/00* (2006.01)
(52) U.S. Cl. .............................. 398/45; 398/49; 398/50
(58) Field of Classification Search .................. 398/19, 398/45–50, 111
See application file for complete search history.

(56) References Cited

U.S. PATENT DOCUMENTS

| | | | |
|---|---|---|---|
| 6,999,677 B1* | 2/2006 | Graves et al. | 398/5 |
| 2003/0184844 A1* | 10/2003 | Yazdi et al. | 359/298 |
| 2004/0047548 A1* | 3/2004 | Okumura et al. | 385/18 |
| 2004/0057655 A1* | 3/2004 | Mori et al. | 385/17 |

FOREIGN PATENT DOCUMENTS

JP 2002-236264 8/2002
JP 2003-029171 1/2003

OTHER PUBLICATIONS

U.S. Appl. No. 09/949,913, filed Sep. 12, 2001, Yuji Tochio et al.
U.S. Appl. No. 09/998,643, filed Dec. 3, 2001, Kazauyuki Mori et al.
U.S. Appl. No. 10/643,895, filed Aug. 20, 2003, Yugi Tochio et al.

* cited by examiner

*Primary Examiner*—Dzung Tran
(74) *Attorney, Agent, or Firm*—Staas & Halsey LLP

(57) ABSTRACT

An object of the invention is to provide a control apparatus and control method for an optical switch with a three-dimensional structure using MEMS mirrors, that can accurately compensate for a change in characteristic due to a temperature variation from an initial setting time, to perform the high speed switching of optical paths. To this end, the control apparatus of the invention, stores in advance in an initial value memory, information of reference temperature related to an inclination angle of each of the MEMS mirrors corresponding to set optical paths, and when a switching command of the optical paths is received, accesses the initial value memory to acquire the information related to the inclination angle at the reference temperature, and also accesses a temperature sensor to read out a temperature of the optical switch, and based on the information acquired from the initial value storing section and the temperature read out from the temperature detecting section, calculates a drive voltage in which a deviation due to the temperature variation from the reference temperature is compensated for, and gives this to the corresponding MEMS mirror as an initial value of the drive voltage.

11 Claims, 4 Drawing Sheets

CONTROL APPARATUS AND CONTROL METHOD FOR OPTICAL SWITCH USING MEMS MIRRORS

BACKGROUND OF THE INVENTION (1) Field of the Invention

The present invention relates to a control apparatus and control method for an optical switch with a three-dimensional structure using micro mirrors (referred to hereunder as MEMS mirrors) manufactured by applying micro machining (MEMS: Micro Electro Mechanical System) technology. In particular, it relates to a controlling technique for compensating for a change in characteristic due to a temperature variation.

(2) Description of Related Art

In recent years, the Internet rapidly expanded has required the implementation of flexible and highly reliable optical networks for rapidly increased communication traffic. Consequently, various optical networks have been proposed provided that the routing is performed per wavelength units. For example, there are optical networks that perform the adding and dropping, the cross connection and the like, of optical signals per wavelength unit.

However, in the optical network as described above, since the number of connected nodes and the number of wavelengths are increased, it is considered that very large scaled optical switches are required for switching optical signals. From this standpoint, an attention has been given to an optical switch with a three-dimensional structure using MEMS mirrors, as an optical switch suitable for large scaling, from the standpoint of coupling losses and the like.

As one controlling technique for MEMS mirrors in the above described three-dimensional type optical switch, the present applicant has proposed a system in which an optimum driving condition of a MEMS mirror is stored in advance in a memory as an initial value corresponding to an optical path connected by a three-dimensional type optical switch, and after receiving a command to connect or switch the optical path, the initial value is read out by accessing the memory, a drive signal corresponding to the initial value is given to the MEMS mirror, and furthermore, a drift due to a temperature variation and the like is compensated for by a feedback control, to maintain an optimum driving condition (refer to Japanese Unexamined Patent Publication No. 2002-236264, Japanese Patent Application No. 2001-216297, Japanese Patent Application No. 2002-242290). According to these prior applications, a three-dimensional type optical switch can be controlled with low optical loss, high accuracy and high speed, thus enabling a small sized, large capacity optical exchange, or the like, to be developed.

Incidentally, the conventional controlling technique as described above still has the following problems. That is, in the case of an optical switch with a three-dimensional structure, since the accuracy in angle of inclination required for a MEMS mirror is strict, if it is shifted from an optimum angle of inclination by even a little, an optical coupling loss is increased significantly. Accordingly, there is a possibility that the optical coupling loss is changed significantly due to a slight variation caused by the temperature variation in mechanical or electrical characteristic of the MEMS mirror, or a slight variation which is caused by the temperature variation of a spatial optical coupling system due to being a three-dimensional structure.

On the other hand, in actual optical networks, there is a requirement for protection times of 50 ms or less over the whole network, for example, so it is necessary to realize the switching of optical paths in several ms in individual optical switch unit. However, if the initial value of the driving condition given to the MEMS mirror when switching optical paths is deviated significantly from the optimum value due to the above-described temperature variation, an amount of compensation in the feedback control which is performed after initialization is increased. Therefore, there is a problem in that the high speed switching of optical paths is difficult.

SUMMARY OF THE INVENTION

The present invention has been accomplished in view of the above problems and has an object of providing a control apparatus and control method for an optical switch using MEMS mirrors, capable of reliably compensating for a change in characteristic due to a temperature variation from an initial setting time, to perform the high speed switching of optical paths.

In order to achieve the above described object, according to the present invention, a control apparatus for an optical switch with a three-dimensional structure that uses a plurality of MEMS mirrors to switch optical paths connecting between a plurality of input and output channels, comprises: a driving device which supplies a drive voltage to the plurality of MEMS mirrors; a controlling device which controls an angle of inclination of each of the MEMS mirrors by changing a state of the drive voltage supplied by the driving device; and an initial value setting device which, when the connection or switching of the optical paths is requested, gives an initial value of drive voltage to be supplied to the MEMS mirror corresponding to the request to the driving device. The initial value setting device of this control apparatus comprises: an initial value storing section that stores in advance information of reference temperature in relation to the angle of inclination of each of the MEMS mirrors corresponding to the optical path setting; a temperature detecting section that detects a temperature of the optical switch; and a calculating section that, when the connection or switching of the optical paths is requested, acquires the information of the reference temperature corresponding to the request, from the initial value storing section, reads out the temperature of the optical switch detected by the temperature detecting section, calculates a drive voltage in which a deviation due to the temperature variation from the reference temperature is compensated for, based on the information acquired from the initial value storing section and the temperature read out from the temperature detecting section, and gives the calculated drive voltage to the driving device as an initial value.

In the control apparatus with such a construction, when the connection or switching of optical paths is requested, in the initial value setting device, the information related to the angle of inclination for the reference temperature stored in the initial value storing section is acquired, and at the same time, the temperature of the optical switch detected by the temperature detecting section is read out, and based on the information acquired from the initial value storing section and the temperature read out from the temperature detecting section, the optimum value of drive voltage in which the deviation due to the temperature variation is compensated for is calculated, and the calculated result is given to the corresponding MEMS mirror as the initial value of the drive voltage. This enables the change in characteristic due to the temperature variation of the optical switch to be compensated for reliably from the initial setting stage. Thus, it becomes possible to perform the switching operation of the optical switch at a high speed.

Furthermore, a control method of the present invention for an optical switch with a three-dimensional structure that uses a plurality of MEMS mirrors to switch optical paths connecting between a plurality of input and output channels, for supplying a drive voltage to the plurality of MEMS mirrors; and controlling an angle of inclination of each of the MEMS mirrors by changing a supply state of the drive voltage, comprises: when the connection or switching of the optical paths is requested, accessing an initial value storing section that stores in advance information of reference temperature in relation to the angle of inclination of each of the MEMS mirrors corresponding to the optical path setting to acquire the information of the reference temperature corresponding to the request and also accessing a temperature detecting section that detects a temperature of the optical switch to read out the temperature of the optical switch; calculating a drive voltage in which a deviation due to the temperature variation from the reference temperature is compensated for, based on the information acquired from the initial value storing section and the temperature read out from the temperature detecting section; and giving the calculation result to a corresponding MEMS mirror as an initial value.

Other objects, features and advantages of the present invention will become apparent from the following description of embodiments, in conjunction with the appended drawings.

BRIEF DESCRIPTION OF THE INVENTION

DETAILED DESCRIPTION OF THE INVENTION

Figure 1:
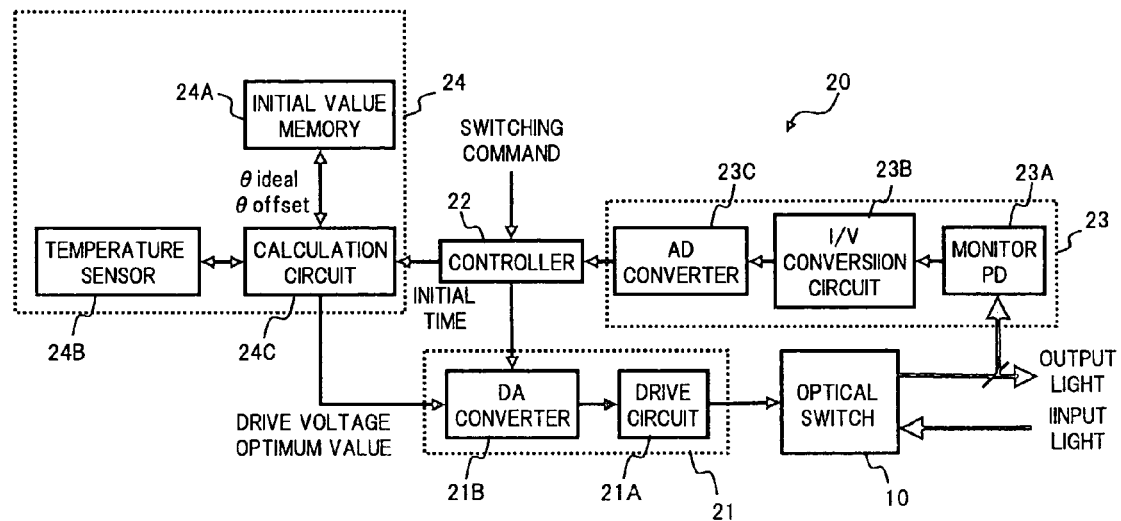
FIG. 1 is a block diagram showing the structure of a control apparatus according to a first embodiment of the present invention.

Hereunder is a description of the best mode of a control apparatus and control method of an optical switch using MEMS mirrors according to the present invention, based on the appended drawings. Here, same reference numerals denote the same or equivalent parts throughout all of the drawings.

Figure 2:
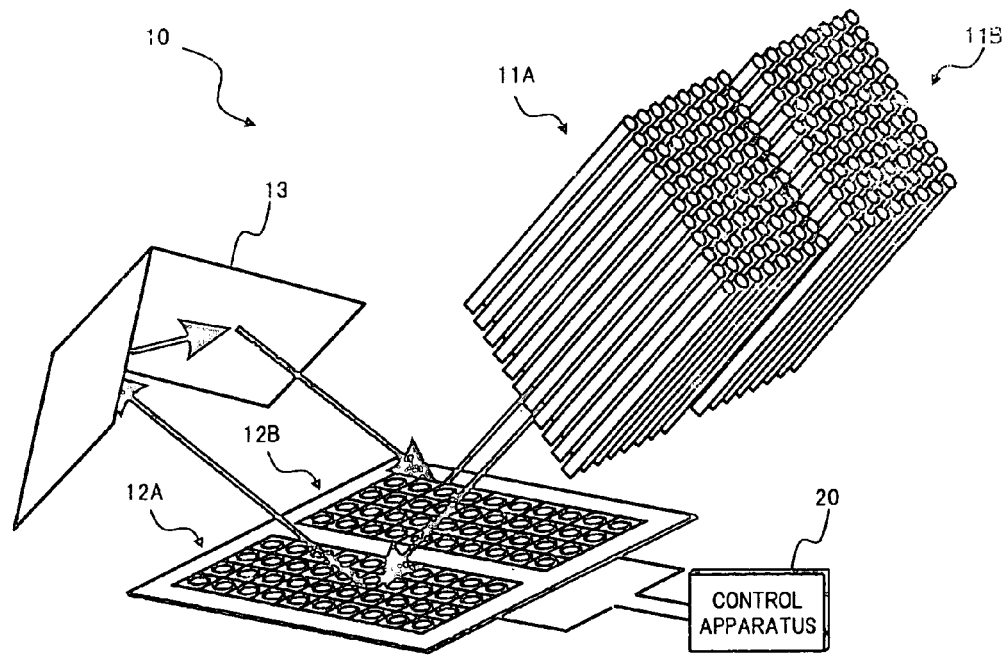
FIG. 2 is a perspective view showing the main structure of an optical switch using MEMS mirrors, to which the control apparatus of FIG. 1 is applied.

FIG. 1 is a block diagram showing the structure of a control apparatus according to a first embodiment of the present invention. FIG. 2 is a perspective view showing the main structure of an optical switch using MEMS mirrors, to which the control apparatus of FIG. 1 is applied.

Firstly, as shown in FIG. 2, an optical switch 10, to which a control apparatus 20 of the present embodiment is applied, has a three-dimensional structure in which, for example, each of optical signals of respective channels output from input optical fibers arranged in an input optical fiber array 11A is reflected at a required angle by each of the MEMS mirrors on an input side MEMS mirror array 12A, after which the optical signal shifts the optical path thereof in parallel to be folded by an L-shaped fixed reflection plate 13 such that a propagation direction thereof is reversed, then reflected by a required angle by a corresponding MEMS mirror on an output side MEMS mirror array 12B arranged alongside the input side MEMS mirror array 12A, to be output to the outside from an output optical fiber on a specific position in the output optical fiber array 11B.

Both the input side MEMS mirror array 12A and the output side MEMS mirror array 12B have a construction in which a plurality of MEMS mirrors is arranged in two dimensions, and each of the MEMS mirrors is driven in accordance with a control signal transmitted from the control apparatus 20, so that an angle of each reflecting surface is controlled according to the setting of optical path connecting between the input and the output.

The MEMS mirrors arranged in the MEMS mirror arrays 12A and 12B are well-known reflection type micro mirrors made by applying micromachining (MEMS) technology. To be specific, for example, a movable plate, which is supported by a torsion bar, and on the surface of which a mirror is formed, is provided integrally on a silicon substrate, and by rotating the movable plate about the torsion bar by an electromagnetic force, an angle of inclination of the mirror can be variably controlled. Here, a drive voltage in accordance with the control signal from the control apparatus 20 is supplied to each of the MEMS mirrors, thus holding each mirror at a desired angle of inclination.

The control apparatus 20, as shown in FIG. 1 for example, comprises; a driving section (DRV) 21 that drives the MEMS mirrors of the optical switch 10 with the three-dimensional structure as described above, a controller 22 generating a control signal for controlling a driving condition of each of the MEMS mirrors by the driving section 21 according to an optical path switching command or the like given from outside, a monitor section 23 that monitors a state of optical signal output from the optical switch 10 and feeds back the monitoring result to the controller 22, and an initial value setting section 24 that gives to the drive section 21 an initial value of optimum drive voltage of which temperature characteristic is compensated for, when connecting or switching the optical paths.

The driving section 21 includes, for example, a drive circuit 21A and a DA converter 21B. The drive circuit 21A supplies a drive voltage in accordance with an analog signal output from the DA converter 21B, to each of the MEMS mirrors arranged on the MEMS mirror arrays 12A and 12B of the optical switch 10, to adjust the angle of the reflecting surface of each of the MEMS mirrors. The DA converter 21B converts the control signal output from the controller 22 and a signal indicating an optimum value of drive voltage output from the initial value setting section 24, from digital to analog to output them to the drive circuit 21A.

The controller 22 receives the switching command from the outside or the like, and also a signal indicating the monitoring result of the monitor section 23, and when the connection or switching of input and output channels in the optical switch 10 is instructed by the abovementioned switching command, outputs a control signal corresponding to the switching command to the initial value setting section 24 in a first control cycle, and outputs a feedback control signal corresponding to the output signal from the monitor section 23 to the driving section 21, in subsequent control cycles.

The monitor section 23 includes, for example, a monitor PD 23A, an I/V conversion circuit 23B, and an AD converter 23C. The monitor PD 23A branches to receive a part of the optical signal output from each output optical fiber in the output optical fiber array 11B of the optical switch 10 as a monitoring light, and generates a current signal corresponding to the power of monitoring light. The I/V conversion circuit 23B converts the current signal corresponding to the power of monitoring light output from the monitor PD 23A into a voltage signal, to output it to the AD converter 23C. The AD converter 23C converts the voltage signal output from the I/V conversion circuit 23B from analog to digital, to output it to the controller 22.

The initial value setting section 24 includes, for example, an initial value memory 24A, a temperature sensor 24B and a calculation circuit 24C. The initial value memory 24A stores in advance information of an optimum angle of inclination of the reflecting surface of each of the MEMS mirrors according to the setting of optical path connecting between the input and output channels of the optical switch 10, at a reference temperature (for example, 25° C.). The temperature sensor 24B is a typical sensor capable of detecting the ambient temperature of the optical switch 10. On receiving an output signal from the controller 22, the calculation circuit 24C accesses the initial value memory 24A to acquire the information of the optimum angle of inclination at the reference temperature corresponding to the switching command, reads out the temperature of the optical switch 10 detected by the temperature sensor 24B, calculates an initial value of the optimum drive voltage in which a change in the angle of inclination of the MEMS mirror caused by a temperature variation is compensated for, based on the information, and outputs a signal indicating the calculation result to the driving section 21.

Next is a description of the operation of the control apparatus according to the first embodiment.

Figure 3:
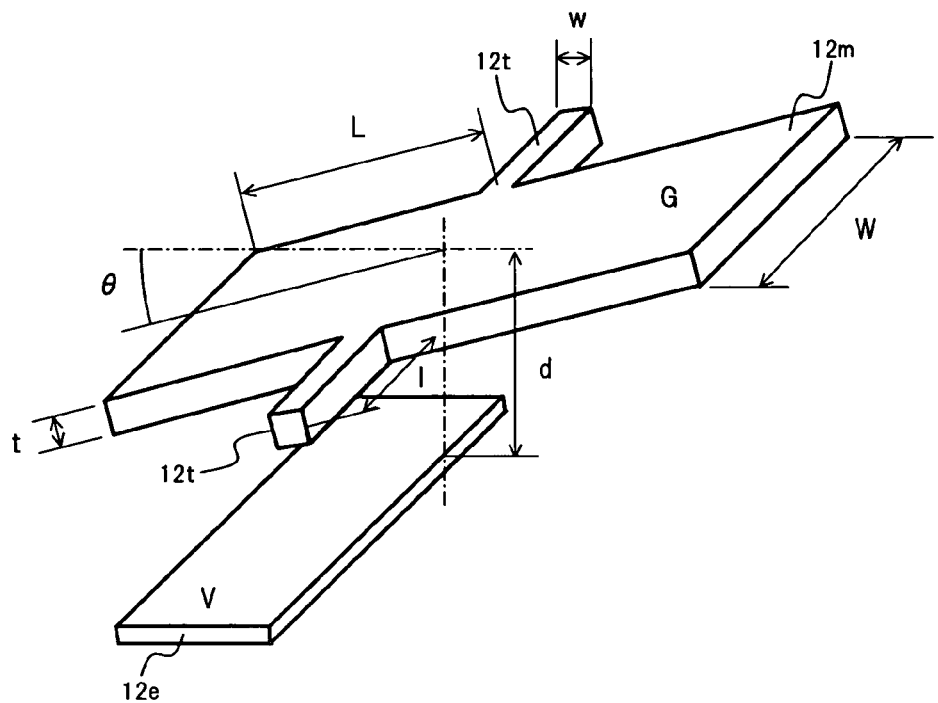
FIG. 3 is a diagram for explaining a relationship between a drive voltage supplied to a MEMS mirror and an angle of inclination of the mirror.

Firstly, a relationship between the drive voltage supplied to the MEMS mirror and the angle of inclination of the mirror will be described. Here, for example, as shown in FIG. 3, using as an analysis model the case where a drive voltage V is applied to an electrode 12e to electrostatically actuate a parallel plane type torsion bar 12t and a mirror 12m, a relationship between the drive voltage V and the angle of inclination θ is considered.

In this analysis model, if a mechanical torque exerting on the torsion bar 12t is Tm, and an electrical torque exerting on the torsion bar 12t is Te, then the mechanical torque Tm and the electrical torque Te can be expressed by the following equations (1) and (2) respectively.

$$Tm = k \cdot \theta \qquad (1)$$
$$= 2 \frac{G \cdot w \cdot t^3}{3 \cdot l} \left(1 - \frac{192}{\pi^5} \cdot \frac{t}{w} \cdot \tanh \frac{\pi \cdot w}{2 \cdot t}\right) \cdot \theta$$

$$Te = \frac{\varepsilon_0}{2} \cdot W \cdot lg \cdot V^2 \qquad (2)$$

Where in the above equation (1), k is a spring constant of the torsion bar 12t, G is a modulus of transverse elasticity (Modulus of Rigidity) of the torsion bar 12t, w is the width of the torsion bar 12t, t is the thickness of the mirror 12m, and l is the length of the torsion bar 12t on each side. Furthermore, in equation (2), $\varepsilon_0$ is an electric constant, W is the width of the mirror 12m (length of side parallel to the torsion bar 12t), and Ig is moment of inertia. In addition, the spring constant k and the moment of inertia Ig are defined by the following equations (3) and (4).

$$k = 2 \cdot \frac{G \cdot w \cdot t^3}{3 \cdot l} \left(1 - \frac{192}{\pi^5} \cdot \frac{t}{w} \cdot \tanh \frac{\pi \cdot w}{2 \cdot t}\right) \qquad (3)$$

$$lg = \int_0^L \frac{x}{[(d/\sin\theta - x) \cdot \theta]^2} dx \qquad (4)$$

Where in the above equation (4), L is the length of the mirror 12m (distance between the center of the torsion bar 12t and one end face of the mirror 12m).

The relationship between the drive voltage V and the angle of inclination θ of the mirror can be expressed by the following equation (5) based on Tm=Te.

$$V = \sqrt{\frac{\theta}{A} \cdot k} \qquad (5)$$

Where A in the above equation (5) indicates the following equation (6).

$$A = \frac{\varepsilon_0 \cdot W \cdot lg}{2} \qquad (6)$$

In equation (3) representing the spring constant k, since the modulus of transverse elasticity G has a temperature gradient, a spring constant k(τ), in which the temperature variation is considered, is represented by the following equation (7) by using the spring constant k at 25° C., a temperature coefficient $k_{tmp}$ of the spring constant, and temperature τ.

$$k(\tau) = k\{1 + k_{tmp} \cdot (\tau - 25)\} \qquad (7)$$

By substituting the relationship of the above equation (7) into equation (5), the relationship between the drive voltage V and the angle of inclination θ of the mirror can be derived as shown in the following equation (8).

$$V = \sqrt{\frac{\theta}{A} \cdot k \cdot \{1 + k_{tmp} \cdot (\tau - 25)\}} \qquad (8)$$

Figure 4:
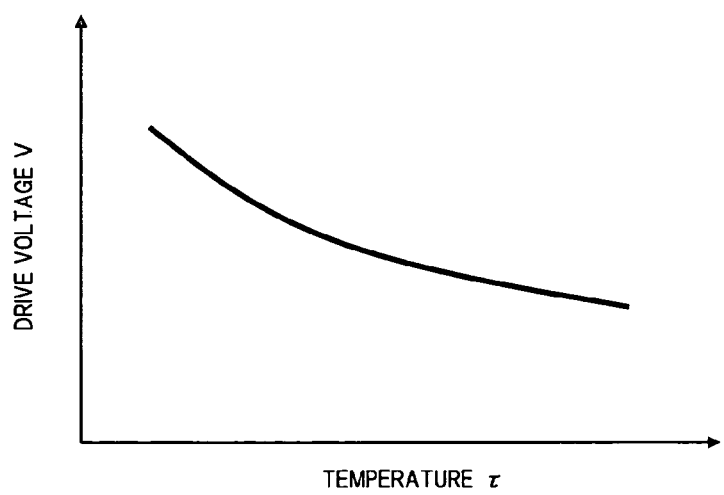
FIG. 4 is a characteristic diagram showing an example of a variation of drive voltage due to a temperature variation.

FIG. 4 is a diagram showing the variation in the drive voltage V due to the temperature variation required to obtain a certain angle of inclination θ, in accordance with the relationship of the above equation (8). Thus, it is possible to obtain, by calculation, an optimum value of drive voltage V according to the temperature variation, based on the above equation (8) and the relationship shown in FIG. 4.

Therefore, in the control apparatus 20 in the present embodiment, when the switching command from the outside or the like instructs the controller 22 to make a new input and output channel connection in the optical switch 10, or to switch the optical paths already connected, a signal corresponding to the switching command is transmitted from the controller 22 to the calculation circuit 24C of the initial value setting section 24. Upon receiving the signal from the controller 22, the calculation circuit 24C first accesses the initial value memory 24A to acquire the information of the optimum angle of inclination at the reference temperature (here 25° C.) corresponding to the switching command. To be specific, this information contains the angle of inclination $\theta_{ideal}$ of the mirror determined uniquely from the physical position of the input and output channel connected corresponding to the switching command, and an offset angle $\theta_{offset}$ determined, for example, by the dispersion of the shape of each of the optical elements constituting the optical switch 10, the variation at the time of assembling, and the like. In this case, an angle corresponding to the sum of the angle $\theta_{ideal}$ and the angle $\theta_{offset}$ corresponds to an actual angle of inclination $\theta$ of MEMS mirror ($\theta = \theta_{ideal} + \theta_{offset}$).

Furthermore, in the calculation circuit 24C, concurrently with acquiring the information from the initial value memory 24A, the temperature of the optical switch 10 detected by the temperature sensor 24B, is read out. Then, by using the angle of inclination $\theta$ of the MEMS mirror at 25° C. acquired from the initial value memory 24A, and the temperature $\tau$ detected by the temperature sensor 24B, the optimum value of drive voltage V corresponding to the present temperature $\tau$ is calculated in accordance with the relationship of the above equation (8), and a signal indicating the calculation result is transmitted to the driving section 21. In the present embodiment, assuming that the spring constant k at 25° C., the temperature coefficient $k_{tmp}$ of the spring constant, and the value of the parameter A represented by equation (6) can be considered to be almost identical among the MEMS mirrors, each of the representative values is set in the calculation circuit 24C in advance.

In the driving section 21, when the signal indicating the optimum value of drive voltage V, in which the error due to temperature variation is compensated for, is transmitted from the initial value setting section 24, the signal is transmitted to the drive circuit 21A via the DA converter 21B. As a result, the drive voltage, in which the temperature characteristic is compensated for, is supplied as an initial value to each of the MEMS mirrors on both the input side and output side corresponding to the switching command of the optical switch 10, and the angle of inclination of each of the mirrors is thus initialized in an optimum state.

By the first time control by the switching command as described above, when the angle of inclination of each of the MEMS mirrors of the optical switch 10 is adjusted to the optimum state corresponding to the present temperature, then the state of the light output from the optical switch 10 is monitored by the monitor section 23, and the driving condition of each of the MEMS mirrors is feedback controlled so that the output optical power reaches maximum, or the output optical power reaches a required level or above, based on the monitoring result. For specific method of this feedback control after initialization, it is possible to apply technology disclosed in detail in the abovementioned Japanese Unexamined Patent Publication No. 2002-236264, and technology proposed previously in Japanese Patent Application No. 2001-2162697 and Japanese Patent Application No. 2002-242290.

According to the control apparatus 20 in the first embodiment as described above, when the connection or switching of the optical paths between the input and output occurs in the optical switch 10, the optimum value of drive voltage calculated according to the temperature of the optical switch 10 at that time is given to the corresponding MEMS mirrors of the optical switch 10. Thus, it is possible to avoid a situation in which, as in the conventional control technique, a large optical coupling loss occurs due to the temperature variation at the stage when the initial value of the drive voltage is given, so that a long time is required for subsequent optimization by the feedback control. As a result, it becomes possible to realize the high speed switching in the optical switch 10 with the three-dimensional structure.

Furthermore, since the present control apparatus 20 enables the optimum value of drive voltage to be calculated according to the temperature of the optical switch 10 in accordance with the relationship of equation (8) described above, it is possible to obtain an effect in that the capacity of the initial value memory 24A can be reduced. That is, in the case where the optimum value at each temperature is stored in the memory corresponding to a temperature range in which the optical switch 10 is used, if for example the number of input and output channels of the optical switch 10 is N, the accuracy of data stored in the memory is 14 bits, the number of points of temperature data is M, and if it is considered that each MEMS mirror requires data corresponding to two axis directions, the capacity C of the memory is required to be the number of bits indicated in the following at minimum.

$C$(capacity)=$N^2$(number of combinations)×2(axes)×2 (number of input and output mirrors)×14(bits)× $M$(number of temperature data points)

Even if data between temperatures are interpolated by a known method, it is necessary to increase the number of temperature data points to be stored in the memory in advance in order to improve the control accuracy. Thus, the capacity of the memory becomes extremely large. However, if the temperature characteristic is compensated for by utilizing the relationship of equation (8) as in the present control apparatus 10, the capacity required for the initial value memory 24A may be at least 1/M times the minimum capacity C required for the above case, and it is not necessary to consider error factors, such as interpolation between temperature points. Consequently, according to the present control apparatus 10, even assuming the case of a large scaled optical switch, it becomes possible to avoid an explosive increase of memory capacity, and at the same time, the temperature characteristic compensation can be realized with high accuracy.

In the first embodiment described above, the temperature characteristic is compensated for, assuming that the spring constant k of each of the MEMS mirrors of the optical switch 10 is almost identical. However, since the spring constant of the MEMS mirror is determined by the shape of the torsion bar as shown in the aforementioned equation (3), sometimes the dispersion in the shape cannot be ignored. In particular, since the torsion bars are made using deep RIE or the like, the dispersion in their shapes occurs easily. In order to deal with such a situation, for example, also the spring constants k in each axis direction are individually stored in the initial value memory 24A for each of the MEMS mirrors of the optical switch 10, and when calculating the optimum value of drive voltage according to the temperature in the calculation circuit 24C, the corresponding spring constant k stored in the initial value memory 24A may be read out to be used for the calculation. The spring constants individually stored in the initial value memory 24A may be obtained using a known interpolation method considering the distribution of dispersion in the MEMS mirror array surfaces. As described above, by dealing with the dispersion of the spring constant, it becomes possible to control the optical switch 10 with higher accuracy.

Next is a description of a control apparatus for an optical switch using MEMS mirrors according to a second embodiment.

Figure 5:
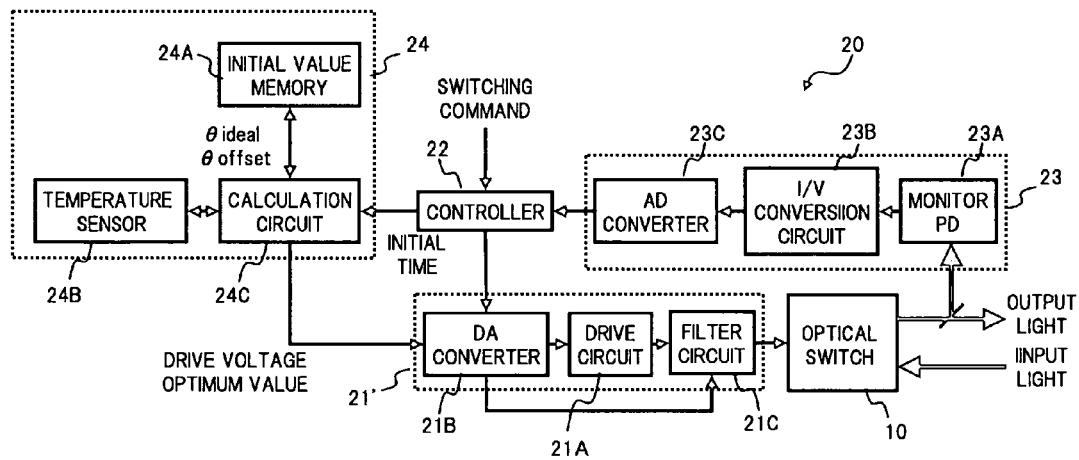
FIG. 5 is a block diagram showing the structure of a control apparatus according to a second embodiment of the present invention.

FIG. 5 is a block diagram showing the structure of the control apparatus of the second embodiment.

In FIG. 5, the structure of the control apparatus 20 of the present embodiment differs from the first embodiment shown in FIG. 1 in that instead of the driving section 21, there is provided a driving section 21', in which a filter circuit 21C is inserted between the drive circuit 21A and the optical switch 10. The parts other than the above are the same as those of the first embodiment, and hence the descriptions thereof are omitted here.

The filter circuit 21C is for removing a frequency component corresponding to mechanical resonance movement occurring when each of the MEMS mirrors of the optical switch 10 is driven, from the drive signal given from the drive circuit 21A to each of the MEMS mirrors of the optical switch 10. For a specific structure of this filter circuit 21, for example, a structure proposed previously in the above-described Japanese Patent Application No. 2002-242290 can be applied.

In general, it is known that the frequency fr of mechanical resonance movement of the MEMS mirror has a relationship as shown in the following equation (9).

$$fr = \frac{1}{2\pi}\sqrt{k/l} \quad (9)$$

Such a vibration due to mechanical resonance of MEMS mirror may have a harmful effect on the feedback control of the angle of inclination of the MEMS mirror, leading a factor that prevents a high speed switching operation of the optical switch 10. Consequently, it is necessary to remove the frequency component corresponding to the mechanical resonance of the MEMS mirror, from the drive signal of the MEMS mirror. Incidentally, the frequency corresponding to the mechanical resonance is varied depending on the temperature change in the MEMS mirror, so considering a variation in the resonant frequency due to the temperature change, it is necessary, for example, to reduce Q value of the filter circuit 21C according to an amount of the variation, to increase the tolerance to the variation due to the temperature change. However, by reducing Q value of the filter circuit 21, the time required for optimization by the feedback control is made longer.

Therefore, in the control apparatus 20 in the present embodiment, a filter factor of the filter circuit 21C is optimized according to the temperature τ of the optical switch 10, based on a relationship of the following equation (10) derived from the aforementioned equation (7) and equation (9), so as to enable Q value of the filter circuit 21 to be high.

$$fr = \frac{1}{2\pi}\sqrt{\frac{k\{1 + k_{tmp} \cdot (\tau - 25)\}}{l}} \quad (10)$$

According to the second embodiment as described above, since high Q value is realized by the temperature compensation of the filter factor, for the filter circuit 21C for removing the frequency component corresponding to the mechanical resonance of MEMS mirror, from the drive signal, it becomes possible to perform stably the switching operation of the optical switch 10 at a higher speed.

Next is a description of a control apparatus for an optical switch using MEMS mirrors according to a third embodiment of the present invention.

Figure 6:
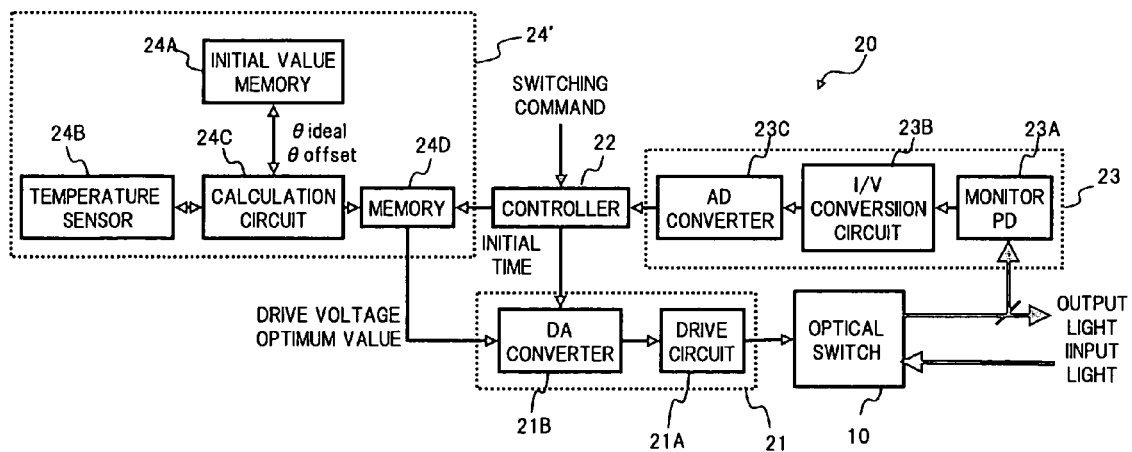
FIG. 6 is a block diagram showing the structure of a control apparatus according to a third embodiment of the present invention.

FIG. 6 is a block diagram showing the structure of the control apparatus of the third embodiment.

In FIG. 6, the structure of the control apparatus 20 of the present embodiment differs from that of the first embodiment shown in FIG. 1 in that instead of the initial value setting section 24, there is provided an initial value setting section 24', in which a memory 24D is added to store the calculation result processed in the calculation circuit 23C. The parts other than the above are the same as in the case of the first embodiment, and hence the descriptions thereof are omitted here.

In the control apparatus in the first embodiment described above, when receiving the switching command, the calculation circuit 24C accesses the initial value memory 24A and the temperature sensor 24B to calculate the optimum value of drive voltage V according to the temperature. Therefore, a delay occurs according to the calculation time from when the switching command is received until the MEMS mirror actually operates. If the time required for the switching operation of the optical switch 10 is from when the switching command is received until the optimization control of the MEMS mirror is completed, the delay according to the calculation time is included in the switching time.

Therefore, in the control apparatus 20 in the present embodiment, in order to shorten the switching time of the optical switch 10, the optimum value of drive voltage V according to the temperature is calculated at required time intervals in the initial value setting section 24' regardless of whether the switching command is received or not, and the calculation result is stored in the memory 24D. Then, when the switching command is received, the optimum value of drive voltage V corresponding to the switching command is read out from the memory 24D, to be sent to the driving section 21.

As a result, the delay time from when the switching command is received until the MEMS mirror actually operates is only the time required to read out the information from the memory 24D, and is thus shortened compared with the delay time in the first embodiment. Consequently, it becomes possible to perform the switching operation of the optical switch 10 at a higher speed. In addition, if the processing speed of a CPU or the like used in the calculation circuit 24C of the initial value setting section 24 is increased, or a CPU capable of high speed access to the initial value memory 24A and temperature sensor 24B is used in the calculation circuit 24C, it is evidently possible to further shorten the time required to calculate the optimum value of drive voltage.

The third embodiment shows an example in which the structure of the first embodiment is improved, and similarly, it is also possible to achieve the high speed switching operation of the optical switch 10 in the structure of the second embodiment.

Next is a description of a control apparatus for an optical switch using MEMS mirrors according to a fourth embodiment of the present invention.

In the above-described first to third embodiments, the mechanical and electrical characteristics of the MEMS mirror are addressed, and the deviation of drive voltage due to the temperature variation is compensated for. In this case, there is no compensation for the deviation of the angle of inclination of the MEMS mirror due to the influence of temperature variation of the three-dimensional optical system of the optical switch, that is, the variation in the offset angle $\theta_{offst}$ described above due to the temperature variation. Therefore, in the fourth embodiment, an example will be described in which the initial value of the drive voltage is set according to the temperature while also considering the compensation for the temperature variation of the optical system of the optical switch.

Figure 7:
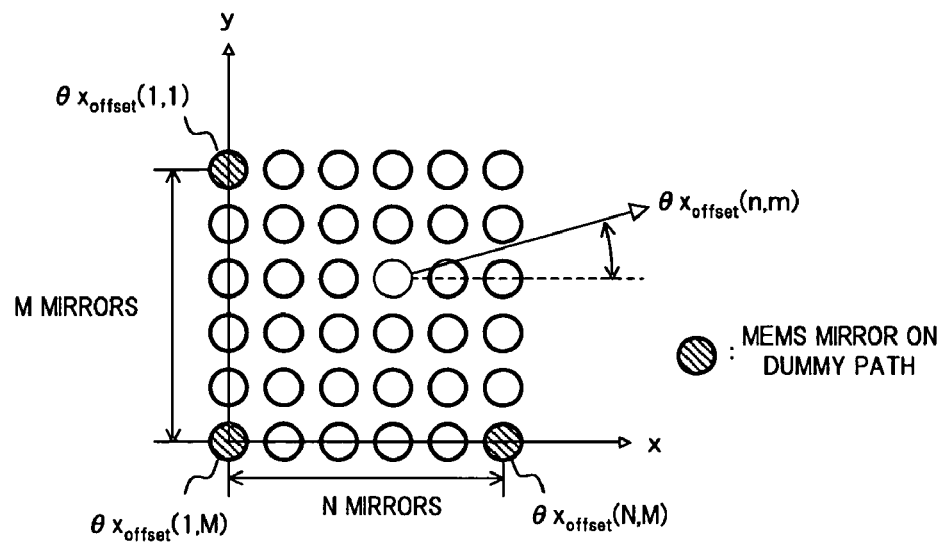
FIG. 7 is a conceptual diagram explaining a method of compensating for a change in characteristic due to the temperature variation of the optical system of an optical switch in a control apparatus of a fourth embodiment of the present invention.

FIG. 7 is a conceptual diagram explaining a method of compensating for temperature variation of the optical system of the optical switch in the control apparatus of the fourth embodiment. The functional block of the control apparatus in the fourth embodiment is for example the same as that in the first embodiment shown in FIG. 1. Here, a specific description is given centered on the compensation for the temperature variation of the optical system.

In the control apparatus of the present embodiment, for example, at least three among a plurality of optical paths that can be set in the optical switch 10 are set to be dummy paths, and the variation in the offset angles $\theta_{offst}$ due to the temperature variation of MEMS mirrors located on the optical paths other than the dummy paths is compensated for, based on the information acquired by the feedback control of the MEMS mirror located on each of the dummy paths. To be specific, among the plurality of optical paths set in the optical switch 10, three optical paths including any of the MEMS mirrors located at the four corners on each of the MEMS mirror arrays 12A and 12B on the input side and output side are set as dummy paths. In FIG. 7, the MEMS mirrors located on the three dummy paths of one of the MEMS mirror arrays are shown as hatched circles. In this example, among M×N MEMS mirrors arranged in two-dimensions on the MEMS mirror array, a MEMS mirror located at the top left corner (coordinate (1, 1)), a MEMS mirror located at the bottom left corner (coordinate (1, M)), and a MEMS mirror located at the bottom right corner (coordinate (N, M)) are on any of the dummy paths. In the present embodiment, channel light is not propagated through the dummy paths.

By feedback controlling the MEMS mirrors on the dummy paths set as described above, the variation in the offset angles $\theta_{offst}$ due to the temperature variation of MEMS mirrors is compensated for, in accordance with the following basic theory. That is, in general, it is considered that the temperature variation in the optical system of the optical switch with the three-dimensional structure is predominantly caused by a difference between thermal expansion coefficients of respective elements constituting the optical switch. Furthermore, the angle of inclination of the MEMS mirror is in fact no more than a few degrees. Consequently, it becomes possible to interpolate the offset angle $\theta x_{offset}$ (n, m) in the x-axis direction (horizontal axis) of the MEMS mirror located on the coordinates (n, m) shown by the black circle in FIG. 7, by linear approximation in accordance with a relationship of the following equation (11), using the offset angles $\theta x_{offset}$ (1, 1), $\theta x_{offset}$ (1, M) and $\theta x_{offset}$ (N, M) of the three MEMS mirrors located on the dummy paths.

$$\theta x_{offset}(n, m) = \left( \frac{\theta x_{offset}(1, 1) - \theta x_{offset}(1, M)}{M} \cdot m + \frac{\theta x_{offset}(1, M) - \theta x_{offset}(N, M)}{N} \cdot n \right) + \theta x_{offset}(1, M) \quad (11)$$

Here, the offset angle $\theta x_{offset}$ in the x-axis direction is considered. However, the offset angle $\theta y_{offset}$ in the y-axis direction (vertical axis) in FIG. 7 is similar to the case of the x-axis direction.

In the present control apparatus, the MEMS mirrors located on the dummy paths are feedback controlled to optimize their angles of inclination, so that the actual angle of inclination θ of the corresponding MEMS mirror can be obtained by the calculation in accordance with the relationship of the abovementioned equation (8), by using the drive voltage values obtained during the feedback control, and the temperature detected by the temperature sensor 24B. Then, the offset angles $\theta_{offset}$ of the MEMS mirrors on the dummy paths can be obtained for both axis directions by calculating the difference the actual angle of inclination to the ideal angle $\theta_{ideal}$ (angle of inclination determined uniquely by the physical position) of each of the MEMS mirrors on the dummy paths.

When the offset angles $\theta_{offset}$ of the MEMS mirrors on the three dummy paths are obtained in this manner, the offset angles $\theta_{offset}$ according to the present temperature are obtained by the calculation, for the MEMS mirrors other than the MEMS mirrors on the dummy paths in accordance with the relationship of equation (11). Then, the obtained offset angles $\theta_{offset}$ of the MEMS mirrors are reflected in the calculation of the optimum value of drive voltage performed by the initial value setting section 24 when the switching command is received, that is, the initial value of the optimum drive voltage is calculated by using the temperature variation compensated offset angle $\theta_{offset}$, which is calculated by using the dummy paths, instead of the offset angle $\theta_{offset}$ at the reference temperature stored in the initial value memory 24A.

As a result, it is possible to supply the drive voltage in which not only the mechanical and electrical temperature variations in the MEMS mirror, but also the temperature variation in the three-dimensional optical system of the optical switch 10, are compensated for, to each of the MEMS mirrors as the initial value when connecting or switching the optical paths. Therefore, it is possible to switch the optical switch 10 at an even higher speed.

In the above-described fourth embodiment, only dedicated optical paths that do not propagate channel light therethrough are set as dummy paths. However, the present invention is not limited thereto, and it is also possible to compensate for the variation in the offset angles of the MEMS mirrors due to the temperature variation, based on the condition of feedback control in the optical paths through which channel light is propagated and that are actually operated. In this case, it is possible to calculate the offset angle according to the temperature of the MEMS mirror similarly to the case of the fourth embodiment by calculating the ideal angle $\theta_{ideal}$ of the MEMS mirror corresponding to the connection setting of the optical paths in operation.

Next is a description of a control apparatus for an optical switch using MEMS mirrors according to a fifth embodiment of the present invention.

Figure 8:
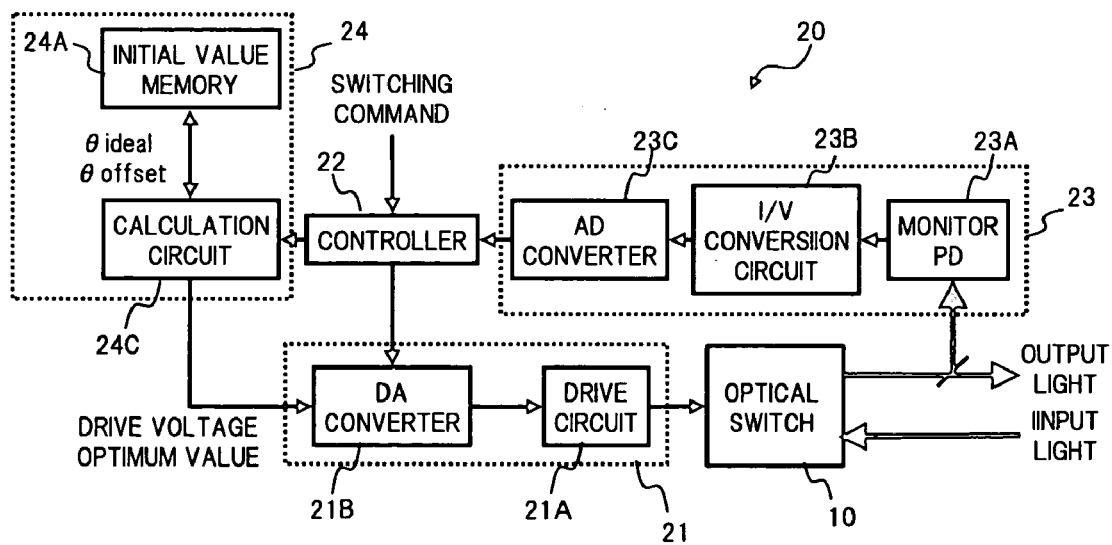
FIG. 8 is a block diagram showing the structure of a control apparatus according to a fifth embodiment of the present invention.

FIG. 8 is a block diagram showing the structure of the control apparatus of the fifth embodiment.

In FIG. 8, a control apparatus 20 of the present embodiment enables the temperature sensor 24B provided in the initial value setting section 24 in the structure of the first embodiment shown in FIG. 1 to be omitted, by judging the temperature of the optical switch 10 based on the information acquired during the feedback control of the MEMS mirrors.

To be specific, in the control apparatus 20 in the present embodiment, by using the optimized drive voltage obtained when each of the MEMS mirrors of the optical switch 10 is feedback controlled, the temperature of the optical switch 10 is obtained by the calculation in accordance with the following procedure. However, the compensation for the temperature variation in the optical system of the optical switch as described in the fourth embodiment is not considered, but only the compensation for the mechanical and electrical temperature variations of the MEMS mirrors is considered.

From the relationship of the abovementioned equation (8), the ideal drive voltage $V_{ideal}$ at the reference temperature can be expressed by the following equation (12). Furthermore, the optimum drive voltage $V_{FB}$ acquired during the feedback control of the MEMS mirror can be expressed by the following equation (13).

$$V_{ideal} = \sqrt{\frac{\theta_{ideal}}{A} \cdot k} \quad (12)$$

$$V_{FB} = \sqrt{\frac{\theta_{ideal}}{A} \cdot k \cdot \{1 + k_{tmp} \cdot (\tau - 25)\}} \quad (13)$$

When the temperature $\tau$ is solved based on the above equations (12) and (13), a relationship shown in the following equation (14) can be obtained, where $\Delta V = V_{FB} - V_{ideal}$.

$$\tau = \frac{1}{k_{tmp}} \left( \frac{A}{k \cdot \theta_{ideal}} \cdot \Delta V^2 + 2 \cdot \sqrt{\frac{A}{k \cdot \theta_{ideal}}} \cdot \Delta V \right) + 25 \quad (14)$$

Here, since $\Delta V$ in the above-described equation (14) is a difference between $V_{FB}$ acquired during the feedback control and the ideal drive voltage $V_{ideal}$ at the reference temperature of 25° C., it is a known value if the MEMS mirror is feedback controlled. Accordingly, it is possible to calculate the temperature of the optical switch based on equation (14), and hence the temperature sensor can be omitted. The above-described calculation is executed by the calculation circuit 24C in the initial value setting section 24 when the MEMS mirror is feedback controlled.

When the temperature $\tau$ of the optical switch 10 is obtained by the calculation as described above, using the obtained temperature $\tau$, the optimum value of drive voltage according to the temperature $\tau$ is calculated in accordance with the relationship of equation (8) similarly to the case of the first embodiment described above, and the drive voltage to be given to the MEMS mirror when the switching command is received is initialized.

In this manner, according to the control apparatus 20 in the fifth embodiment, it is possible to calculate the optimum value of drive voltage in which the temperature characteristic is compensated for, without using a temperature sensor. Therefore, it becomes possible to simplify the structure of the apparatus and reduce the cost.

What is claimed is:

1. A control apparatus for an optical switch with a three-dimensional structure that uses a plurality of MEMS mirrors to switch optical paths connecting between a plurality of input and output channels, comprising: driving means for supplying a drive voltage to said plurality of MEMS mirrors; controlling means for controlling an angle of inclination of each of the MEMS mirrors by changing a state of the drive voltage supplied by said driving means; and initial value setting means for, when the connection or switching of said optical paths is requested, giving an initial value of drive voltage to be supplied to the MEMS mirror corresponding to said request to said driving means, wherein said initial value setting means comprising:

an initial value storing section that stores in advance information of reference temperature in relation to the angle of inclination of each of the MEMS mirrors corresponding to the optical path setting;

a temperature detecting section that detects a temperature of said optical switch; and a calculating section that, when the connection or switching of the optical paths is requested, acquires the information of the reference temperature corresponding to said request, from said initial value storing section, reads out the temperature of said optical switch detected by said temperature detecting section, calculates a drive voltage in which a deviation due to the temperature variation from the reference temperature is compensated for, based on the information acquired from said initial value storing section and the temperature read out from said temperature detecting section, and gives the calculated drive voltage to said driving means as an initial value.

2. A control apparatus for an optical switch using MEMS mirrors according to claim 1, wherein said calculating section calculates a drive voltage V in which a deviations due to said temperature variation is compensated for, using a relationship expressed by the following equation, $$V = \sqrt{\frac{\theta}{A} \cdot k \cdot \{1 + k_{tmp} \cdot (\tau - \tau_0)\}}$$

where $\theta$ is the inclination angle of the MEMS mirror corresponding to the information acquired from said initial value storing section, $\tau$ is the temperature acquired from said temperature detecting section, $\tau_0$ is the reference temperature, k is a spring constant of the MEMS mirror at the reference temperature, and $k_{tmp}$ is a temperature coefficient of the spring constant of the MEMS mirror at the reference temperature.

3. A control apparatus for an optical switch using MEMS mirrors according to claim 1, wherein said initial value storing section stores in advance information of reference temperature including; a theoretical value of the inclination angle of the MEMS mirror determined from physical positions of input and output channels connected by the optical path, and an off-set angle of the MEMS mirror determined according to the state of optical members constituting said optical switch.

4. A control apparatus for an optical switch using MEMS mirrors according to claim 1, wherein said initial value storing section stores in advance information of spring constant at reference temperature corresponding to each of the MEMS mirrors of said optical switch, and said calculating section calculates the drive voltage in which the deviation due to said temperature variation is compensated for, using the information of spring constant stored in said initial value storing section, separately for each of the MEMS mirrors.

5. A control apparatus for an optical switch using MEMS mirrors according to claim 1, wherein said driving means includes a resonance component removing filter removing a frequency component corresponding to the mechanical resonance operation of said MEMS mirror, contained in the drive signal supplied to each of the MEMES mirrors of said optical switch, and in said resonance component removing filter, a change in filter characteristic due to the temperature variation is compensated for, by controlling a filter coefficient according to the temperature of said optical switch detected by said temperature detecting section.

6. A control apparatus for an optical switch using MEMS mirrors according to claim 1, wherein said initial value setting section includes a memory for storing the calculation results in said calculating section, and irrespectively of whether or not the connection or switching of the optical path a requested, said calculating section calculates the drive voltage in which the deviation due to the temperature variation is compensated for, to update the information stored in said memory, and when said connection or switching of the optical path is requested, acquires the drive voltage corresponding to said request from said memory, and gives said drive voltage to said driving means as the initial value.

7. A control apparatus for an optical switch using MEMS mirrors according to claim 1, further comprising output monitoring means for monitoring an output condition of light for which input and output channels have been switched by said optical switch, wherein said control means, after the initial value of drive voltage has been given to said driving means by said initial value setting means, feedback controls the supply condition of the drive voltage by said driving means, according to the monitor result of said output monitoring means.

8. A control apparatus for an optical switch using MEMS mirrors according to claim 7, further comprising an offset compensation means for compensating for a deviation due to the temperature variation of an offset angle of the MEMS mirror determined according to the state of optical members constituting said optical switch, based on the drive voltage supplied to the MEMS mirror by said driving means which is feedback controlled by said control means.

9. A control apparatus for an optical switch using MEMS mirrors according to claim 8, wherein said offset compensation means sets at least three of the plurality of optical paths set in said optical switch to dummy paths, and based on the drive voltage supplied by said driving means to the MEMS mirrors existing on said respective dummy paths, compensates for a deviation due to the temperature variation of the offset angle of each of the other MEMS mirrors.

10. A control apparatus for an optical switch using MEMS mirrors according to claim 7, wherein said initial value setting means comprises means for obtaining the temperature of said optical switch by calculation, based on the drive voltage supplied to the MEMS mirror by said driving means which is feedback controlled by said control means, instead of said temperature detecting section.

11. A control method for an optical switch with a three-dimensional structure that uses a plurality of MEMS mirrors to switch optical paths connecting between a plurality of input and output channels, for supplying a drive voltage to said plurality of MEMS mirrors; and controlling an angle of inclination of each of the MEMS mirrors by changing a supply state of the drive voltage, comprising:

when the connection or switching of the optical paths is requested, accessing an initial value storing section that stores in advance information of reference temperature in relation to the angle of inclination of each of the MEMS mirrors corresponding to the optical path setting to acquire the information of the reference temperature corresponding to said request and also accessing a temperature detecting section that detects a temperature of said optical switch to read out the temperature of said optical switch;

calculating a drive voltage in which a deviation due to the temperature variation from the reference temperature is compensated for, based on the information acquired from the initial value storing section and the temperature read out from the temperature detecting section; and supplying the calculation result to a corresponding MEMS mirror as an initial value of the drive voltage.

* * * * *

UNITED STATES PATENT AND TRADEMARK OFFICE
CERTIFICATE OF CORRECTION

PATENT NO.         : 7,155,125 B2  
APPLICATION NO. : 10/752187  
DATED                 : December 26, 2006  
INVENTOR(S)       : Kazuyuki Mori Page 1 of 1

It is certified that error appears in the above-identified patent and that said Letters Patent is hereby corrected as shown below:

Column 15, Line 16, change "MEMES" to --MEMS--.

Signed and Sealed this

Third Day of April, 2007

JON W. DUDAS  
*Director of the United States Patent and Trademark Office*